United States Patent [19]  
Larson

[11] 4,096,997  
[45] Jun. 27, 1978

[54] DUAL OUTLET CHECK VALVE ASSEMBLY

[75] Inventor: Richard E. Larson, Minnetonka, Minn.

[73] Assignee: Cherne Industrial, Inc., Edina, Minn.

[21] Appl. No.: 718,217

[22] Filed: Aug. 27, 1976

Related U.S. Application Data

[63] Continuation-in-part of Ser. No. 631,842, Nov. 13, 1975, abandoned.

[51] Int. Cl.² ............................................. B05B 7/24
[52] U.S. Cl. ..................................... 239/413; 137/512; 239/533.13; 239/544
[58] Field of Search ........... 239/413, 418, 426, 533.13, 239/543, 544, 600; 137/512; 285/384, 247, 248

[56] References Cited

U.S. PATENT DOCUMENTS

| 2,373,555 | 4/1945 | Folke | 239/534 X |
| 3,108,918 | 10/1963 | Plumley | 239/544 X |
| 3,199,787 | 8/1965 | Oishei et al. | 239/534 X |
| 3,214,102 | 10/1965 | Meyer | 239/534 X |
| 3,286,931 | 11/1966 | Webb | 239/534 X |
| 3,865,133 | 2/1975 | Alford | 137/512 |

FOREIGN PATENT DOCUMENTS

339,897  2/1934  Germany ..................... 239/533.13

Primary Examiner—Joseph F. Peters, Jr.  
Assistant Examiner—Michael Mar  
Attorney, Agent, or Firm—Merchant, Gould, Smith, Edell, Welter & Schmidt

[57] ABSTRACT

A non-clogging check valve assembly useful in the simultaneous dispensing of individual components of a two-part grouting material. Two opposed flexible outlet nozzles mounted adjacent one another in a body member allow the components to be dispensed in a mixing relationship. The outlet nozzles are dome-shaped and contain slot-like apertures to allow the dispensing of the components under pressure and to prevent the clogging re-entry of the components into the valve which would otherwise result from back pressures developed as the components combine and react.

8 Claims, 8 Drawing Figures

DUAL OUTLET CHECK VALVE ASSEMBLY

CROSS-REFERENCE TO RELATED APPLICATION

This application is a continuation-in-part of application Ser. No. 631,842, filed Nov. 13, 1975, now abandoned.

BACKGROUND OF THE INVENTION

1. Field of the Invention

Non-clogging check valve apparatus for use in simultaneously dispensing two substances.

2. Description of the Prior Art

With recent developments in the chemical industry, there are many situations wherein it is desirable to dispense two substances from separate supply lines. In many applications it is desirable that each substance be dispensed through a simple valve device which allows the substance to be ejected under pressure and which also prevents the backflow of the substance through the valve when the dispensing pressure is reduced. Various two-substance grouting materials require that there be simultaneous dispensing of the two substances. In systems where two substances must be thoroughly mixed in order to initiate a chemical reaction it is desirable that each substance be dispensed in a mixing relationship with regard to the dispensing of the other substance.

Various check valve devices have long been utilized for dispensing a single fluid, generally a liquid. Most such valves have comprised arrangements of various moving parts including spring or similar biasing means which act to maintain the valve in a normally closed position. Generally, such devices have been inadequate for purposes of dispensing various liquids because of their relative complexity, their use of moving parts which require the presence of lubrication or other contaminating substances, and their need for maintenance due to failure of the moving parts. In addition, the use of such valves to dispense certain substances has often resulted in frequent clogging of the valves due to the presence of solid nodules contained in the substances being dispensed or to the backflow of the material into the valve after the dispensing has ceased. Such clogging of the valves requires that they be cleaned frequently, thus interrupting the dispensing operation of the valve. This is particularly the case when it is necessary to use valves in two-substance grouting applications wherein the mixing of the individual substances institutes a curing reaction which develops pressure in the valve area and forms a relatively solid material: it may be difficult if not impossible to remove the solid material from the valve once it has cured. For these reasons, the design of various check valves which are presently available prevents or discourages their use with various chemical substances which are dispensed simultaneously and which change composition from a flowable to a non-flowable material.

SUMMARY OF THE INVENTION

The present invention is for a check valve assembly which is particularly useful in despensing individual components of a two-substance or multi-substance chemical system such as a two-part grouting system. The new check valve assembly utilizes a valve body which contains recesses for retaining nozzle elements having deformable outlet surfaces. Each deformable outlet surface has a generally conical exterior shape and contains a slot-like aperture extending from the apex of the conical surface radially downward toward the valve body. Two such conical elements are positioned in the valve body adjacent one another so that the slot-like apertures are aligned.

The use of the flexible outlet surface with the slot-like aperture allows the surface to deform when internal pressure is applied by the substance which is to be dispensed through the valve nozzle. This deformation forces the outlet aperture to open, allowing the substance being dispensed to flow through the aperture. While the substances are generally liquid in form, in many instances the liquid may contain solid nodules. The new valve nozzles allow the passage of these nodules through the opening without clogging. Because the conical surface forms a shell-like structure, back pressure which may develop outside of the valve nozzle does not change the outlet aperture from its normally closed position and therefore the dispensed substances cannot re-enter the valve nozzles.

In one embodiment of the invention, the deformable nozzles are suitably positioned by means of threaded retention members which screw into the valve body. Internal threads on the retention sleeves allow individual flexible supply lines to be self-threaded into the sleeves, thereby communicating with the outlet apertures. Each liquid substance is dispensed through an individual supply line and nozzle aperture. In a second embodiment, the deformable nozzles are held in position, and connected to flexible supply lines, by the joint action of threaded retention members and conical hollow connecting members, no threading of the supply lines being required.

By positioning the slot-like apertures generally opposite and adjacent one another, the substances are dispensed through the apertures in fan-like patterns which provides an advantageous intermixing of the two substances as they are dispensed from the valve nozzles. The ability of the valves to pass solid nodules in the liquid substances, while at the same time preventing the backflow of the substances into the valve after dispensing, results in a generally non-clogging valve assembly which can be reused after a dormant period without extensive reconditioning or cleaning.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DETAILED DESCRIPTION OF THE DRAWINGS

DETAILED DESCRIPTION OF THE PREFERRED EMBODIMENTS

Referring to FIGS. 1-4, wherein like numerals refer to like structural elements, the present invention is a dual-outlet check valve assembly, generally designated by the numeral 1, which is particularly useful as a dispensing means for a two-substance grouting material. The valve may be used as an element of an expandable sleeve packer such as that shown in FIG. 1, generally designated by the numeral 0. Such expandable sleeve packers are typically utilized for forcing grouting material into interior cracks or joint openings in sewer drain pipes and the like. In applications utilizing this type of equipment, the grouting compounds usually consist of two relatively inert liquid elements which react chemically when mixed, the mixture ultimately curing to form a semi-solid sealing material to fill a leak or void in a pipe.

Figure 1:
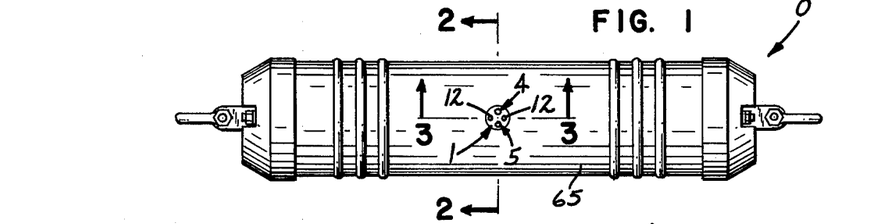
FIG. 1 is a side elevational view of a packing device with a valve assembly mounted therein.

The valve assembly 1 generally comprises a valve body 2 which is retained in a mounting collar 3. Valve body 2 supports two nozzle elements, designated by the numerals 4 and 5, which are used to dispense two different substances such as the component parts of a two-substance grouting material. Nozzle elements 4 and 5 are mounted in valve body 2 by means of first and second bores, 6 and 7, which are machined or otherwise formed in the valve body. First and second retention members in the form of sleeves, 8 and 9, respectively, are utilized to retain nozzle elements 4 and 5 within their respective bores. Associated with nozzle elements 4 and 5 are supply lines 10 and 11, respectively, which communicate between sources of the substances to be dispensed by the valve assembly 1 and nozzle elements 4 and 5. Attachment screws, each designated by the numeral 12, or other suitable means may be utilized for securing valve body 2 to mounting collar 3.

Figure 2:
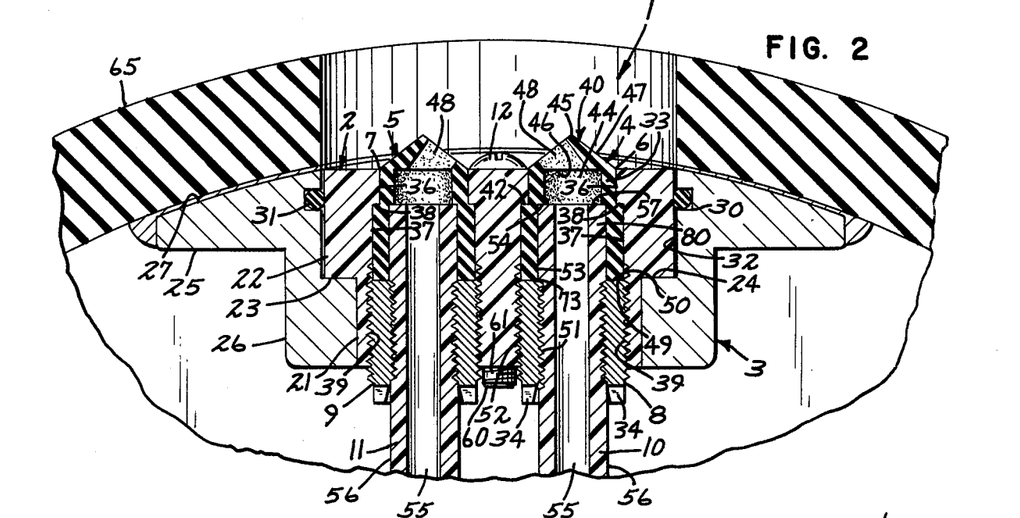
FIG. 2 is a detailed fragmentary view of the valve assembly in longitudinal section taken along the line 2—2 of FIG. 1.
Figure 3:
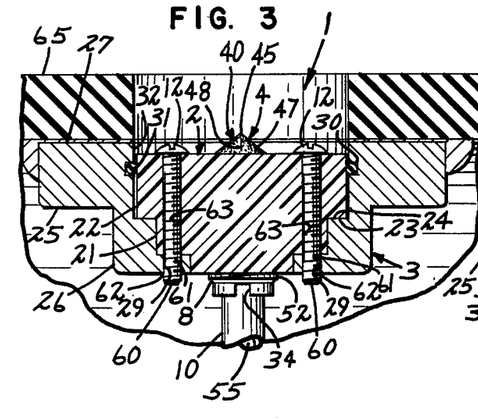
FIG. 3 is a detailed fragmentary view of the valve assembly in transverse section taken along the line 3—3 of FIG. 1.

Referring specifically to FIGS. 2 and 3, in the preferred embodiment valve body 2 is comprised of a generally cylindrical base portion 21 which is integrally attached to a cylindrical upper portion 22. The exterior surface of upper portion 22 and base portion 21 are interconnected by means of a shoulder surface 23. Corresponding to the exterior surfaces of valve body 2 are interior surfaces of an opening 32 in mounting collar 3 which allows valve body 2 to be seated within the opening. A seat surface 24 which forms a portion of the interior surface of opening 32 abuttingly engages shoulder 23 of valve body 2.

It is the purpose of mounting collar 3 to be attached to a barrier element which may enclose the area into which the two chemical components are being dispensed from valve assembly 1. In the preferred embodiment shown in FIGS. 1-4, valve assembly 1 is utilized in combination with expandable sleeve packer 0 to inject a two-substance grouting material into an area which is sealably surrounded by an expandable grouting sleeve 65, which serves as the barrier element. In operation, expandable sleeve 65 moves into abutting contact with an area surrounding a leak or void to be filled with the grouting material in response to the inflation of expandable bladders (not shown) which are contained beneath sleeve 65. In this manner, sleeve 65 surrounds the leak area in a sealing relationship to provide a void into which the grouting material may be injected through valve assembly 1. In this embodiment, mounting collar 3 has a generally cylindrical shape with an indented cylindrical portion 26 which adjoins a flange portion 25 having a larger outside diameter. Flange portion 25 has a rounded exterior surface 27 which generally corresponds with the rounded inner surface of expandable sleeve 65. Flange portion 25 of mounting collar 3 may be bonded or otherwise secured to sleeve 65 in order to form a fluid-tight seal between valve body 2 and sleeve 65. This sealing relationship is further established by means of an O-ring seal 31 which is positioned within an annular O-ring recess 30 contained within the upper portion 25 of collar 3. Annular O-ring recess 30 opens onto the exterior surface of opening 32 and allows the O-ring 31 placed therein to abut against the exterior surface of valve body 2. In this manner, valve body 2 is sealed within mounting collar 3 when the valve body is pressed into opening 32 thereby compressing the O-ring 31 as is well known in the art. It should be noted that means other than mounting collar 3 may be utilized to suitably locate valve assembly 1 adjacent the area into which fluids are being dispensed.

In the described embodiment, two nozzle elements (4 and 5) are utilized to regulate the flow of fluids through valve assembly 1. With the use of nozzle elements 4 and 5, two substances of a two-substance grouting material can be individually injected through valve assembly 1 from supply lines which will be described in detail later. Nozzle elements 4 and 5 fit into valve body bores 6 and 7. Each of bores 6 and 7 has a cylindrical upper opening 36 and a cylindrical lower opening 37 of larger diameter than opening 36. A seat 38 joins the two openings. The lower bore opening 37 includes a threaded portion 39 whose function will be described in detail later.

Nozzle elements 4 and 5 are essentially identical and therefore only the detailed design of nozzle element 4 will be described. Referring to FIG. 2, nozzle element 4 is generally cylindrical in exterior form and is comprised of a cylindrical top portion 33 which contains an upper bore 44 and an adjoining cylindrical base portion 41 which contains a lower bore 53 containing an inlet opening 73, adjoining bore 44. A cone-shaped discharge end 40 adjoins top portion 33. In the described embodiment, the outside diameter of top portion 33 is smaller than the outside diameter of base portion 41. At the point of discontinuity between the outer surfaces of top portion 33 and base portion 41 an annular shoulder 42 is formed. As is shown in FIG. 2, shoulder 42 corresponds to seat surface 38 which is formed at the juncture of two cylindrical bores contained within valve body 2. It is the purpose of seat 38 and shoulder 42 to provide means of support for nozzle element 4 when it is inserted into valve body 2.

Upper bore 44 of nozzle element 4 has a diameter less than the diameter of lower bore 53. This provides an annular shoulder 54 at the juncture between the two bores which serves as a support surface for an end surface 57 of first supply line 10. The exterior diameter of supply line 10 generally corresponds to the interior diameter of lower bore 53 so that when supply line 10 is inserted within bore 53, its end surface 57 abuts shoulder 54 which restricts its forward movement into nozzle element 4. The detailed interface between supply line 10, valve body 2 and nozzle element 4 will be described in detail later.

To provide suitable nozzle means for the ejection of a liquid or semi-liquid material across the barrier which is formed by valve body 2, discharge end 40 of nozzle element 4 is comprised of a conical element 45 having a generally cone-shaped exterior surface 47 and a corresponding interior surface 46. A discharge aperture 48 extends through conical element 45 from interior surface 46 to exterior surface 47. In the preferred embodiment, discharge aperture 48 is a slot-like aperture and generally extends from the apex of surface 47 to the base of cone 45. The use of conical element 45 with discharge slot 48 provides several advantages which may be understood from general teachings in the field of structural mechanics as applied to shells. Nozzle element 4 is made of a flexible elastomeric material. While in the preferred embodiment the entire nozzle element 4 is made from flexible elastomeric material, in other embodiments (not shown) various materials or combinations of materials may be utilized to provide a flexible conical element 45. With the use of flexible conical element 45, discharge slot 48 is "closed" when conical element 45 is in an unstressed state with essentially equal pressures exerted on interior surface 46 and exterior surface 47. When a greater pressure is exerted on interior surface 46 than on exterior surface 47, conical element 45 deforms and discharge slot 48 expands to form an opening between surface 46 and 47. Thus, when a liquid or semi-liquid substance is forced into upper bore 44 to create a pressure on interior surface 46 which is greater than the pressure on exterior surface 47, conical element 45 deforms to open discharge slot 48 and allows the substance to flow through the opening. Because the opening thus formed has a shallow depth and a generally elliptical shape, and is generally unrestricted, any nodules of a solid or semi-solid material which may be contained in the substance being ejected will pass through discharge slot 48. This prevents retention of such materials within nozzle element 4 and the ultimate clogging of the nozzle which they may cause. The shallow depth of opening 48 reduces the wall area adjoining the opening to present less area to which grout and nodules may adhere.

When the pressure applied on interior surface 46 is released, as when the pressurized flow of a substance through supply line 10 is discontinued, conical element 45 takes on its unstressed shape and discharge slot 48 closes, preventing the further flow of liquid. Although conical element 45 deforms in response to positive pressure on the interior conical surface 46, the same deformation and opening of discharge slot 48 generally does not occur when a positive pressure is applied to exterior surface 47 which is greater than the pressure on interior surface 46. It is believed that this phenomenon is due in part to the intrinsic nature of shell-like structures which are subjected to stress or pressure. Because of the conical or dome-shaped contour of element 45, a shell is formed which may be deformed from interior pressure but which, to a greater relative degree, resists deformation due to exterior pressure. For this reason, if valve assembly 1 is utilized to dispense materials which foam or build up pressures on exterior surface 47 after the materials have been ejected, this pressure build-up does not force the mixed chemicals back into upper bore 44 since discharge slot 48 does not open under such exterior pressures. The applicant has found that this greatly reduces the likelihood that solid or semi-solid materials which are formed by the curing of a two-substance grouting material on the exterior of valve assembly 1 may be forced back into nozzle element 4 to result in clogging. While nozzle element 4 has a conical exterior and interior contour in the preferred embodiment, other dome-like shells having outlet slots or openings may be utilized (e.g., surfaces of revolution such as a sphere) which generally obey the laws of the shell-stress theory. As utilized herein, "dome" or "shell" refers to a rounded structure which is generally closed and has a sphere-like, cone-like or similar contour.

Figure 4:
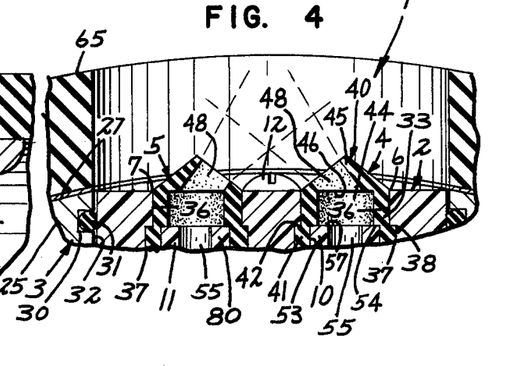
FIG. 4 is a detailed fragmentary sectional view of the flexible nozzle elements showing the spray pattern which they create.
Figure 5:
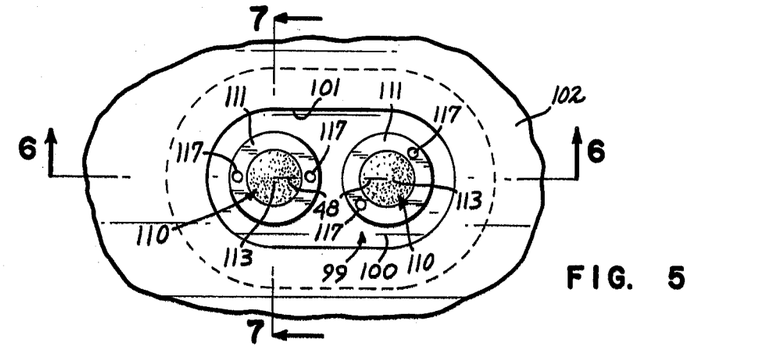
FIG. 5 is a fragmentary view, generally like FIG. 1 but to a larger scale, of a second embodiment of the valve assembly.

The operation and structure of nozzle elment 5 is essentially identical to that described for nozzle element 4. In applications where nozzle elements 4 and 5 are utilized for separate substances of a two-substance material, such as a grouting material, it is advantageous to discharge the two components in a manner which facilitates mixing of the components outside of nozzle elements 4 and 5. The applicant has achieved significant improvements in the mixing of the two substances of a grouting material without the need for a complex mixing chamber, by positioning the discharge slots 48 on elements 4 and 5 opposite one another as is shown in FIG. 4. By orienting the discharge slots 48 in this face-to-face relationship, fans of material discharged through nozzle elements 4 and 5 are caused to intersect to produce good mixing interaction between the two substances. This eliminates the need for a separate mixing chamber.

Elements 4 and 5 are positioned in valve body 2 by means of individual retention sleeves 8 and 9. In the described embodiment, retention sleeves 8 and 9 are cylindrical members which are essentially identical and therefore only retention sleeve 8 will be described in detail. As is shown in FIG. 2, retention sleeve 8 has a threaded exterior surface 52 and a threaded interior surface 51. Exterior threaded surface 52 is intended to engage an interior threaded surface 39 which forms a part of the lower bore 37 contained within valve body 2. By threading retention sleeve 8 into lower bore 37, the top end surface 50 of retention sleeve 8 abuts against the bottom surface 49 of nozzle element 4. This forces the shoulder 42 of nozzle element 4 into engagement with the seat 38 of valve body 2 to securely anchor nozzle element 4 within valve body 2. A tool slot 34 (see FIG. 3) or similar means may be provided in retention sleeve 8 for purposes of screwing the retention sleeve into valve body 2.

In the described embodiment, retention sleeves 8 and 9 are fabricated from a brass material to resist corrosion, and valve body 2 is fabricated from an inert, generally rigid material (e.g. nylon) which resists chemical interaction with the components which are ejected through valve assembly 1. Through the proper selection of material for valve body 2, adhesion of the cured grouting material which may be dispensed through valve assembly 1 is prevented thereby facilitating removal of the valve assembly from the area in which the grout has been emplaced.

In the described embodiment, each of supply lines 10 and 11 contain a supply passageway 55 and has an attachment end 80 which communicates with one of bores 53 and a supply end (not shown) which attaches to a source (not shown) of the substance which is to be dispensed through one of nozzle elements 4 and 5. Supply lines 10 and 11 are fabricated from a plastic material which is generally inert and which will not react with components which are ejected through the supply lines. When a plastically deformable material is utilized for lines 10 and 11, their exterior surface, designated by the numeral 56, need not be threaded. Rather, as the supply line 10 is turned into the interior of retention sleeve 8 (or 9), the exterior surface 56 self-threads as it is deformed by the interior threaded surface 51 of retention sleeve 8. This forms a generally fluid-tight interface between retention sleeve 8 and supply line 10.

Supply line 10 is threaded into retention sleeve 8 to a position where the end surface 57 of supply line 10 abuts the shoulder 54 formed on the interior of nozzle element 4. Because shoulder 54 is positioned generally adjacent shoulder 42 of valve body 2, by applying pressure to shoulder 54 by movement of supply line 10, the cylindrical sides of nozzle element 4 are securely forced between end surface 57 and shoulder 54 to provide a strong seating force to retain nozzle element 4 within valve body 2. Alternatively, when it is necessary to remove nozzle elements 4 and 5 for replacement, they may be easily removed by screwing out supply lines 10 and 11 and subsequently removing the retention sleeves 8 and 9. Nozzle elements 4 and 5 may then be pressed out of valve body 2 through lower bore opening 37 in valve body 2. This allows for quick and easy maintenance and inspection of the component parts of valve body 2.

Valve body 2 may be secured within mounting collar 3 by means of screws or bolts, each designated by the numeral 12, which extend through openings, each designated by the numeral 62, in collar element 7 and openings 63 in valve body 2. Openings 62 may be threaded (e.g. threads 29) to engage matching threads 61 on the base end 60 of each of attachment screws 12. Other suitable means (not shown) may also be utilized for fixing valve body 2 within mounting collar 3.

It should be noted that various numbers of supply lines and nozzle elements may be utilized in the present invention. The applicant has found that when at least two nozzle elements are utilized in the arrangement and combination shown a valve assembly is created which is particularly useful and advantageous for the injection of the individual substances or a two-substance grouting material. Such grouting materials are of the type which generally utilize flowable materials that can be cured with a co-reactant to form a solid or semi-solid material. For instance, a curable monomer or pre-polymer may constitute the first substance of the material and the second substance may be an active hydrogen containing curing agent such as water. An example would be 3M brand "Elstomeric Sewer Grouting Compound". Valve assembly 1 may be utilized for various components wherein the components are fluid or semi-fluid, and may be liquid or gaseous in certain instances.

The construction and operation of valve assembly 1 may be summarized as follows. The valve body 2 is sealably engaged within mounting collar 3 which in turn is mounted within a barrier device such as grouting sleeve 65. This means of mounting provides a sealed area into which substances may be injected through valve assembly 1. There may be other uses for valve assembly 1 wherein a different arrangement (not shown) for supporting valve body 2 may also be utilized. Two flexible nozzle elements (e.g., 4 and 5) are inserted within openings contained in valve body 2. The nozzle elements are held in place in valve body 2 by means of two threaded retention sleeves (e.g., 8 and 9). Supply lines (e.g., 10 and 11) are screwed into the base of the two retention sleeves and form a conduit between the nozzle elements and a source of a substance to be ejected through the nozzle. The upper portion of each nozzle element contains a deformable conical element which has a discharge slot opening. The discharge slot opening is opened by positive pressure which results from pressure being applied to the substance in the supply lines. This pressure opens the discharge slot to allow the substance to flow through the slot, including any solid or semi-solid nodules which may be present. When pressure is discontinued on the substances within the supply lines, the discharge slots close and resist any deformation or opening which may result from exterior positive pressures acting on the conical elements. This prevents re-entry of the discharged material into the nozzle element and subsequent clogging. The various elements of the valve assembly may be removed for inspection, replacement or periodic cleaning. Various means, such as bolts or screws (not shown), may be utilized for mounting the valve body into a supporting or mounting collar in combination with various O-rings or other sealing means.

The applicant has found that the following specific embodiment operates efficiently for dispensing a two-substance grouting material. The outside diameter of the top portion of valve body 2 has a diameter of approximately 2.25 inches and each of nozzle elements 3 and 4 has a cylindrical top portion 33 with an outside diameter of approximately 0.30 inch. The thickness of conical element 45 between surfaces 46 and 47 at the location of discharge slot 48 is approximately 0.060 inch. The inside diameter of each of supply lines 10 and 11 is approximately 0.20 inch. The height of the apex of conical element 45 from the top edge of the cylindrical top portion 33 of nozzle element 4 is approximately 0.15 inch. At the present time, a second sized embodiment which is approximately 1.5 times as large as the above-described embodiment is also being used. With regard to the materials which have been found to be particularly satisfactory for this invention, the valve body 2 is made from high molecular weight polyethylene, mounting collar 3 is cast aluminum, nozzle elements 4 and 5 are silicone rubber, retaining rings 8 and 9 are brass and tubes 10 and 11 are medium density polyethylene. Other appropriate materials and dimensions may be utilized to practice this invention.

Turning now to FIGS. 5-8, wherein like numerals refer to like structural elements, a second embodiment of my invention is shown to comprise a valve assembly 99 including a body or member 100 combining the functions of collar 3 and valve body 4 of the first embodiment. Member 100 is secured in an opening 101 in a grouting sleeve 102 by means such as a suitable adhesive 103, and includes a pair of spaced similar bores 104. Each bore includes an internally threaded portion 105, a shoulder 106, and a tapering portion 107 converging in a direction away from the threaded portion. Cooperating with each bore 104 are a hollow nozzle element 110, a retention member in the form of a sleeve 111, and a bi-conical hollow connecting member 112.

Nozzle element 110 is formed with a discharge end 113 as described in connection with element 40 of the first embodiment. Externally, the other end of element 110 is provided with a shoulder 114, and a washer 115 is provided between shoulder 114 and the inner end of sleeve 111. The sleeve is externally threaded at 116 to fit portion 105 of bore 104, and is provided with spanner holes 117 or other suitable means for tightening it in the bore. Connecting means 112 has a central bore 120, an outer conical portion 121 to engage the inner wall of nozzle element 110, a shoulder 122 for engaging shoulder 114 of element 110 and shoulder 106 of member 101, and an inner conical portion 123 sized for expanding insertion into a supply line 124 of flexible material. Sleeve 111 encompasses nozzle element 110.

Figure 6:
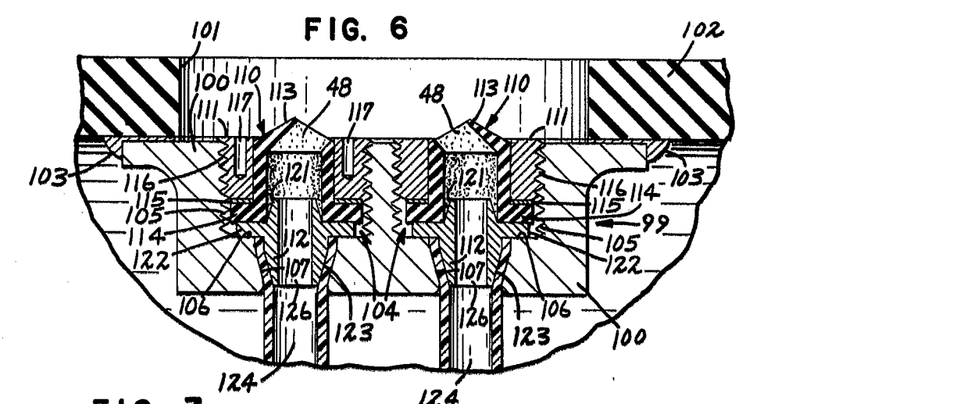
FIG. 6 is a detailed fragmentary view of the second valve assembly in longitudinal section taken along the line 6—6 of FIG. 5.
Figures 7, 8:
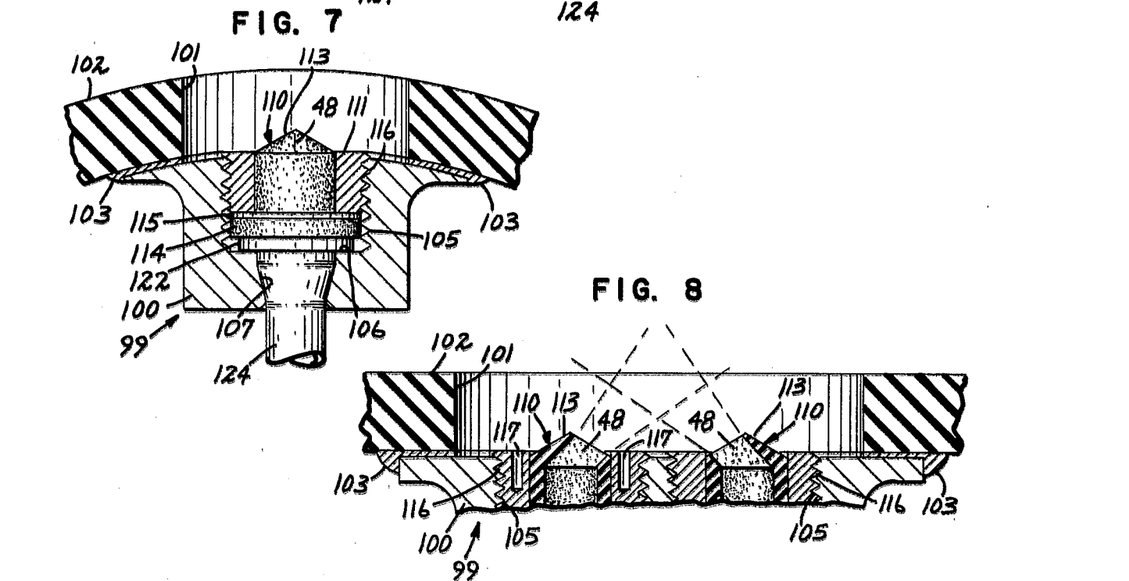
FIG. 7 is a detailed fragmentary view of the second valve assembly in transverse section taken along the line 7—7 of FIG. 5.
FIG. 8 is a detailed view of the second valve assembly similar to FIG. 4.

The apparatus just described is assembled as follows. A supply line 124 is passed through bore 104 in the upward direction as seen at FIG. 6 and the appropriate conical surface 123 of a connecting member 112 is pressed into the supply line until the end of the line engages shoulder 122. The assembly is pushed back into bore 104, and nozzle element 110 is pressed down over the conical surface 121 until shoulders 122 and 114 are in engagement, washer 115 is positioned on shoulder 114 and retainer 111 is threaded down securely to bring shoulders 115 and 122 into engagement and hold the parts firmly together. The supply line 124 is clamped between tapering portion 107 of member 100 and conical surface 123 of member 112, and that member is secured in bore 104 and sealed to nozzle member 110, so that no leakage of material supplied in line 124 can take place. Before finally tightening sleeve 111, the nozzle member is positioned so that its slotted aperture 48 is aligned to direct its fan discharge where desired, as suggested in FIG. 8.

In this embodiment of the invention, it has been found satisfactory to make all parts of a suitable plastic to which the substances being dispensed do not adhere.

The second embodiment of my invention has the advantage over the one previously described that it can be disassembled, for replacement of the deformable nozzles, entirely from the outside of the packer, leaving the connection to the supply lines undisturbed.

From the foregoing, it will be evident that I have invented a new and useful valve assembly which is particularly advantageous in dispensing liquid materials which may contain solid nodules, and which positively prevents inadvertent passage of dispensed substances back toward the source, together with a new valve construction for use in such an assembly. One embodiment of my invention is particularly adapted to rapid and convenient replacement of nozzle elements, the principal service operation in connection with such apparatus.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. A check-valve assembly useful in dispensing the individual liquid substances of a two-substance chemical material without clogging the assembly, comprising:
    a valve body;
    nozzle means supported by said valve body for dispensing liquids under pressure, said nozzle means including at least two nozzle elements, each of said nozzle elements having a tubular bottom portion which adjoins a flexible generally closed dome-shaped upper portion, said dome-shaped upper portion having an exterior surface and an interior surface, said exterior surface having a conical shape tapering downwardly and outwardly from an apex spaced apart from said valve body, and containing a discharge aperture extending between said interior and said exterior surfaces and bounded by opposite sides, said discharge apertures being elongated slot-like apertures having one end positioned generally at said conical surface apex and extending radially therefrom toward said valve body, said nozzle element upper portions being deformable from a normally closed shape, in which the opposed sides of said discharge aperture generally abut one another, to an open shape in which the opposed sides of said discharge aperture are at least partially spaced apart from one another to form an opening therebetween in response to a positive pressure differential acting on said interior surface relative to said exterior surface, said nozzle element upper portion tending to be nondeformable in response to a positive pressure differential acting on said exterior surface relative to said interior surface, the bottom portion of each of said nozzle elements containing an inlet opening in communication with said discharge aperture; and
    means for mounting said nozzle means in said valve body with said discharge apertures generally aligned, said discharge apertures being positioned facing one another to allow fan-like sprays of fluids which may be ejected from said outlet apertures to intersect, thereby facilitating mixing of such fluids.

2. A check-valve assembly useful in dispensing the individual liquid substances of a two-substance chemical material without clogging the assembly, comprising, in combination:
    a valve body containing at least two bores extending therethrough with the center lines of said bores generally parallel to one another;
    nozzle means supported by said valve body for dispensing liquids under pressure at discharge apertures, each of said bores being contoured to receive therein one of said nozzle elements with said discharge aperture positioned outside of said valve body, said nozzle means including at least two nozzle elements, each of said nozzle elements having a tubular bottom portion which adjoins a flexible generally closed dome-shaped upper portion, said dome-shaped upper portion having an exterior surface and an interior surface, said dome-shaped portion containing said discharge aperture extending between said interior and exterior surfaces and bounded by opposite sides, said nozzle element upper portion being deformable from a normally closed shape in which the opposed sides of said discharge aperture generally abut one another, to an open shape in which the opposed sides of said discharge aperture are at least partially spaced apart from one another to form an opening therebetween in response to a positive pressure differential acting on said interior surface relative to said exterior surface, said nozzle element upper portion tending to being nondeformable in response to a positive pressure differential acting on said exterior surface relative to said interior surface, the bottom portions of each of said nozzle elements containing an inlet opening in communication with said discharge aperture; and means for mounting said nozzle means in said valve body with said discharge apertures aligned, including at least two removable retention members, each of said retention members being fixedly positioned with and in engagement with at least a portion of one of said mounting bores and in forced engagement with an end only of one of said nozzle elements located within said bore to retain said nozzle element fixedly in place with respect to said valve body when said retention member is fixedly positioned within said bore.

3. The check-valve assembly of claim 2 including:
a mounting collar having a recess for receiving said valve body therein in fixed relationship relative to said mounting collar; and
securing means for fixedly and sealably mounting said valve body in said mounting collar.

4. The check-valve assembly of claim 2 including:
a conduit element associated with each of said nozzle elements, each of said conduit elements containing a passageway therein and having an attachment end and a supply end; and
attachment means for sealably attaching the attachment end of each of said conduit elements to said valve body with the conduit passageway in communication with the inlet opening of the associated nozzle element to carry a fluid to said nozzle element from a fluid source which may be attached to the supply end of said conduit element.

5. In combination:
a valve body including a bore with a first internally threaded portion of a first diameter and a second coaxial portion of smaller diameter joined thereto at an internal shoulder, said second portion converging in a direction away from said shoulder;
a bi-conical hollow connecting member coaxial with said bore, having a medial shoulder for engaging said internal shoulder and first and second ends extending from said medial shoulder in opposite directions, said first end being smaller than said second portion of said bore and tapering at the same angle;
a hollow resilient nozzle element coaxial with said bore, having a first, open end with an external shoulder and a second, closed dome-shaped end including a normally closed discharge aperture located off the axis of said element, said open end being sized for sealing engagement with said second end of said hollow member and said external shoulder being adapted for engagement with said medial shoulder of said hollow member;
and externally threaded retaining means for encompassing said nozzle element and engaging said external shoulder to secure said hollow member and said nozzle element in said body.

6. A structure according to claim 5 together with a flexible tubular member having an end passing through said second portion of said bore and receiving said first end of said hollow member, so that said retaining member also causes sealing engagement of said tubular member between said body and said hollow member.

7. The structure of claim 5 in which said nozzle element is rotatable about its axis and is lockable in any rotated positioning by tightening of said retaining member.

8. In combination:
means for connecting a flexible tube to a flexible hollow nozzle element having a discharge end and an external shoulder at the end opposite said discharge end, comprising:
a body member having a first bore sized to pass said tube and diverging inwardly at a predetermined angle to join a larger, internally threaded second bore at an internal shoulder sized to receive the shouldered end of said nozzle element;
a hollow connecting member having a medial shoulder sized to be received in said second bore against said internal shoulder, a first end extending from said medial shoulder in a first direction and tapering at substantially said predetermined angle, to receive said tubular member, and a second end extending from said medial shoulder in a second direction to receive the shouldered end of said nozzle element;
and annular retaining means externally threaded to fit said second bore to encompass said nozzle element and engage said external shoulder, so that tightening of said retaining member causes tight engagement of said tube, said body member, said connecting member, and said nozzle element.

* * * * *

UNITED STATES PATENT AND TRADEMARK OFFICE
CERTIFICATE OF CORRECTION

PATENT NO. : 4,096,997
DATED : June 27, 1978
INVENTOR(S) : Richard E. Larson

It is certified that error appears in the above-identified patent and that said Letters Patent are hereby corrected as shown below:

In column 7, line 53, for "Elstomeric" read --Elastomeric--.

Signed and Sealed this

Third Day of April 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,096,997
DATED : June 27, 1978
INVENTOR(S) : Richard E. Larson

It is certified that error appears in the above-identified patent and that said Letters Patent are hereby corrected as shown below:

Column 6, line 15, change "elment" to read --element--.

Signed and Sealed this

Twelfth Day of June 1979

[SEAL]

Attest:

RUTH C. MASON
Attesting Officer

DONALD W. BANNER
Commissioner of Patents and Trademarks